(12) United States Patent
Angus et al.

(10) Patent No.: US 12,296,655 B2
(45) Date of Patent: May 13, 2025

(54) WINDSHIELD WITH OPTICAL WINDOWS FOR SEAL APPLICATION

(71) Applicant: Ford Motor Company, Dearborn, MI (US)

(72) Inventors: Steven Angus, Novi, MI (US); Tom F. Boettger, Dearborn, MI (US); Jeffrey R. Rowland, Brighton, MI (US); Stephanie Ross, Southfield, MI (US); Roger Jones, Southfield, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 18/323,514

(22) Filed: May 25, 2023

(65) Prior Publication Data

US 2023/0382212 A1 Nov. 30, 2023

Related U.S. Application Data

(60) Provisional application No. 63/346,390, filed on May 27, 2022.

(51) Int. Cl.
*B60J 10/70* (2016.01)
*B60J 10/15* (2016.01)
*G01N 21/88* (2006.01)

(52) U.S. Cl.
CPC ............. *B60J 10/70* (2016.02); *B60J 10/15* (2016.02); *G01N 21/8803* (2013.01); *G01N 21/8806* (2013.01)

(58) Field of Classification Search
None
See application file for complete search history.

(56) References Cited

U.S. PATENT DOCUMENTS

| | | | |
|---|---|---|---|
| 5,786,067 A | 7/1998 | Gold | |
| 6,495,261 B1 * | 12/2002 | Gagliardi | B32B 17/10036 296/84.1 |
| 2003/0084995 A1 | 5/2003 | Zhang | |
| 2009/0239017 A1 * | 9/2009 | Ishioka | B32B 17/10761 427/163.1 |
| 2015/0251522 A1 * | 9/2015 | Glikis | B60J 1/005 296/96.21 |
| 2016/0229278 A1 | 8/2016 | Timmermann | |

FOREIGN PATENT DOCUMENTS

DE 102012112663 6/2014

* cited by examiner

*Primary Examiner* — Laura C Powers
(74) *Attorney, Agent, or Firm* — Burris Law, PLLC

(57) ABSTRACT

A vehicle windshield includes a glass sheet and an overlay extending around a periphery of the glass sheet. The overlay includes a plurality of optical windows defined therein. A seal extends along a path delineated by the plurality of optical windows. The optical windows are sized to allow light to pass through the overlay.

20 Claims, 11 Drawing Sheets

WINDSHIELD WITH OPTICAL WINDOWS FOR SEAL APPLICATION

CROSS-REFERENCE TO RELATED APPLICATIONS

This application claims priority to U.S. provisional application No. 63/346,390 filed on May 27, 2022. The disclosure of the above application is incorporated herein by reference.

FIELD

The present disclosure relates to manufacturing and inspection of vehicle components, and more particularly to seals on windshields to an underlying body structure.

BACKGROUND

The statements in this section merely provide background information related to the present disclosure and may not constitute prior art.

Seals between a windshield and a vehicle body are intended to inhibit leakage of air and water/moisture into a passenger cabin. Typically, the seals follow a path around an entire periphery of a windshield and are hidden behind a mask or overlay. Manual installation of the seals may result in deviations of the seal from an intended path. Moreover, primer layers that aid in adhering the seal to the windshield may deviate from the intended path. Such deviations may inhibit the ability of the seal to inhibit leakage of air/moisture and often require reinstallation of the seal, adding to manufacturing cycle time.

These issues related to the installation of seals to windshields are addressed by the present disclosure.

SUMMARY

This section provides a general summary of the disclosure and is not a comprehensive disclosure of its full scope or all of its features.

In one form, a vehicle windshield includes a glass sheet, an overlay extending around a periphery of the glass sheet, the overlay including a plurality of optical windows defined therein, and a seal extending along a path delineated by the plurality of optical windows.

In variations of the vehicle windshield of the above paragraph, which may be implemented individually or in any combination: the vehicle windshield further includes a primer layer disposed between the seal and the overlay; the seal is a urethane material; the optical windows are sized to allow light to pass through the glass sheet; the periphery of the glass sheet defines a contour, and the plurality of optical windows are arranged substantially along the contour; the primer is disposed along the path; the plurality of optical windows define a geometrical shape selected from the group consisting of: circular, elliptical, a polygonal, square, and rectangular shape; a spacing between the plurality of optical windows is constant; a spacing between the plurality of optical windows is variable; and the optical windows are made of a transparent material and the overlay is made of an opaque material.

In another form, a method for forming a vehicle windshield includes forming optical windows in an overlay around a periphery of a glass sheet, providing light to the optical windows to illuminate a path between the optical windows, and applying a seal to the overlay along the illuminated path to cover the optical windows.

In variations of the method of the above paragraph, which may be implemented individually or in any combination: the method further includes applying a primer layer to the overlay along the illuminated path and, then, adhering the seal to the overlay along the illuminated path; after applying the seal, providing the light to the optical windows to detect deviations of the seal from the illuminated path; actuating a light source to provide light to the optical windows to illuminate the path; forming the optical windows substantially along a contour of the periphery of the glass sheet; at least some of the optical windows deviate from the contour of the periphery of the glass sheet; the seal is a urethane material; the plurality of optical windows define a geometrical shape selected from the group consisting of: circular, elliptical, polygonal, square, and rectangular; the seal blocks light through the optical windows when applied to the overlay; and a vehicle windshield is formed according to the method.

In another form, a method of inspecting installation of a seal includes actuating a light source to illuminate optical windows between the seal and a glass sheet, identifying one or more illuminated optical windows not covered by the seal, and adjusting operation of a seal installation device based on the identified one or more illuminated optical windows.

In variations of the method of the above paragraph, which may be implemented individually or in any combination: the method further includes operating the seal installation device to apply a second seal onto a second overlay to cover optical windows disposed thereon; adjusting a seal-laying path of the seal installation device to cover the identified one or more illuminated optical windows; the light source is a handheld light emitter; upon detecting no illuminated optical windows, and determining that the seal is properly installed.

DRAWINGS

In order that the disclosure may be well understood, there will now be described various forms thereof, given by way of example, reference being made to the accompanying drawings, in which.

Figure 1:
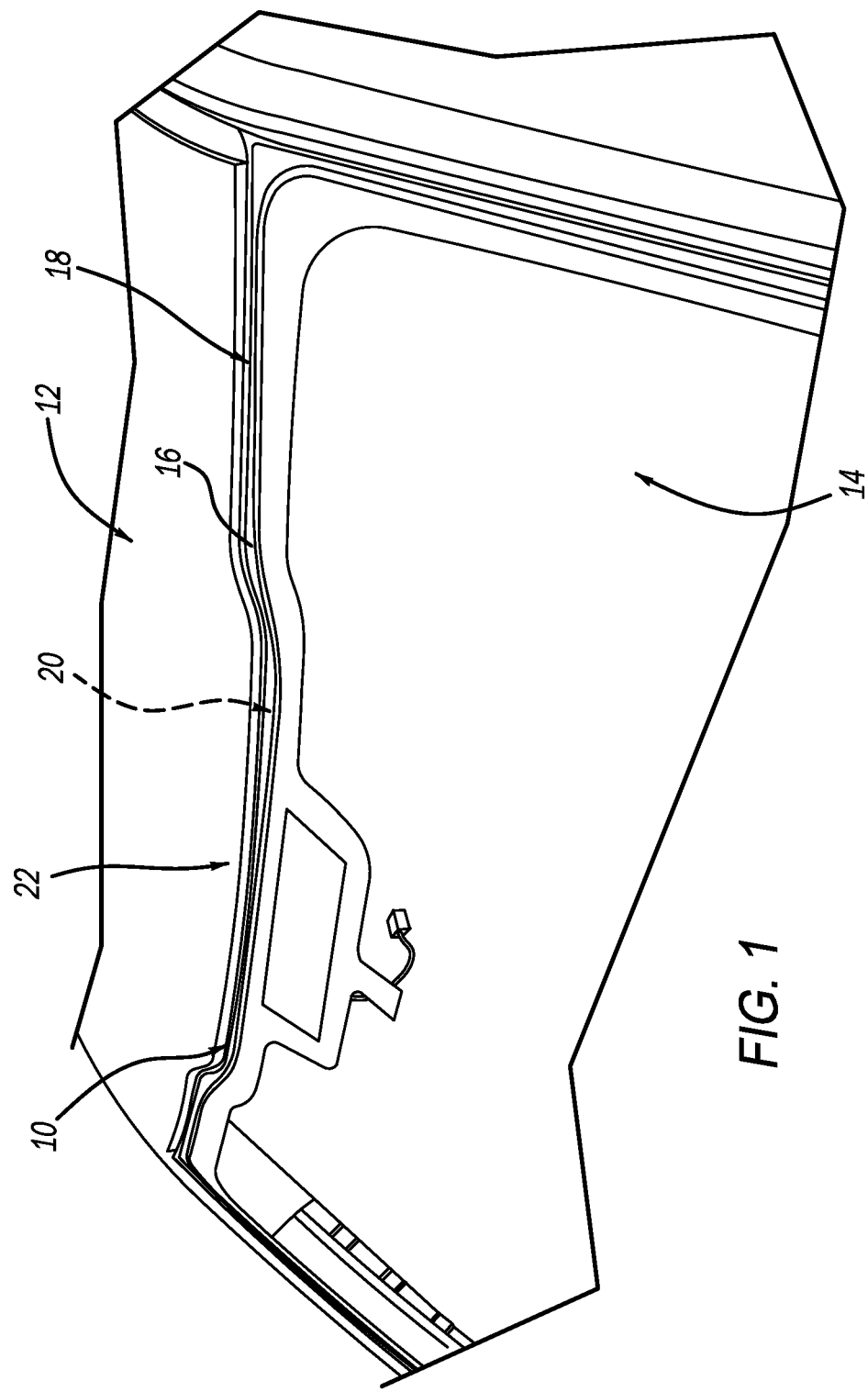
FIG. 1 is a perspective view of a windshield, a seal, and an overlay with optical windows according to the present disclosure.
Figure 2:
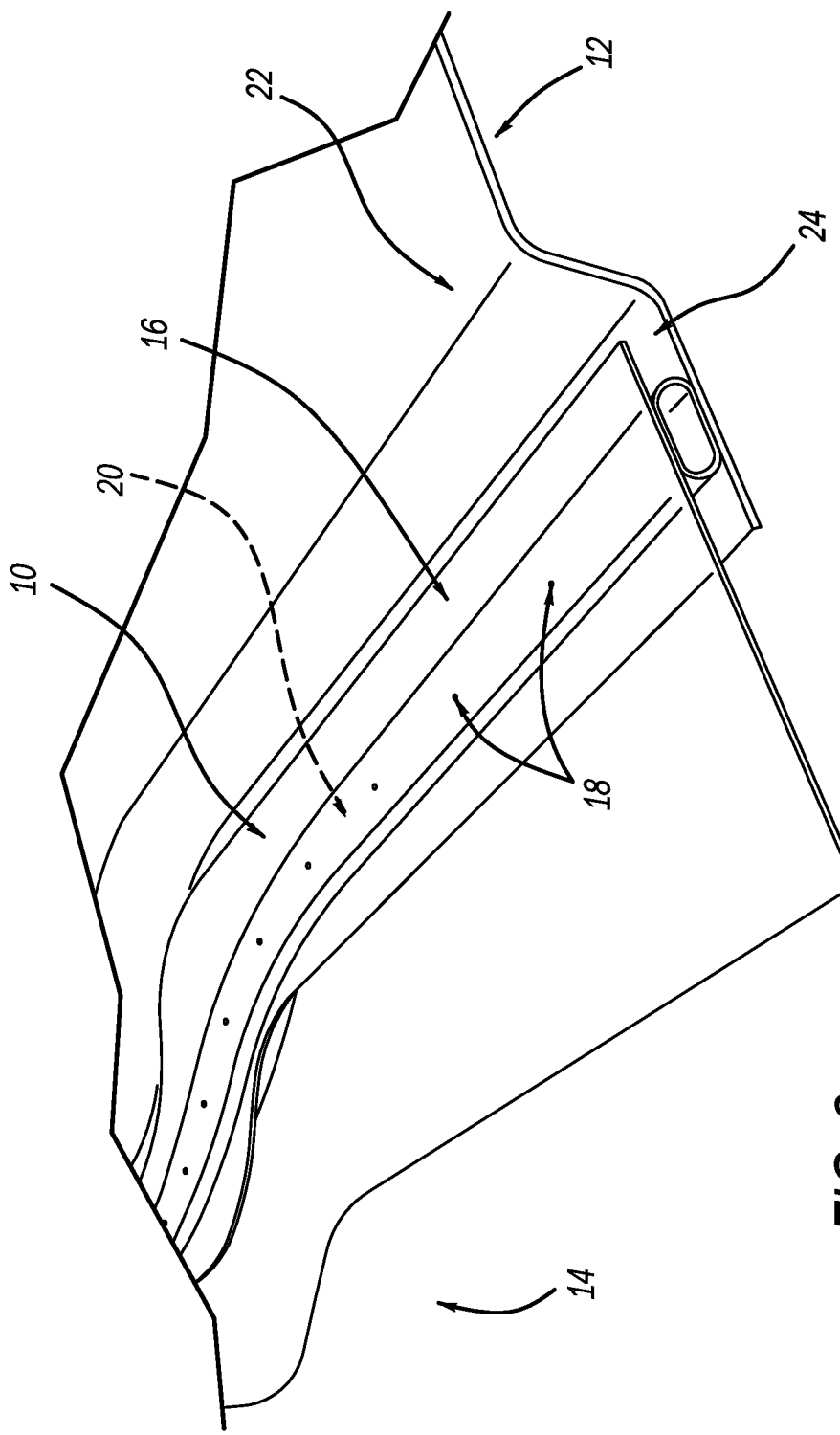
FIG. 2 is a perspective cutaway view of the windshield of FIG. 1 according to the present disclosure.
Figure 3:
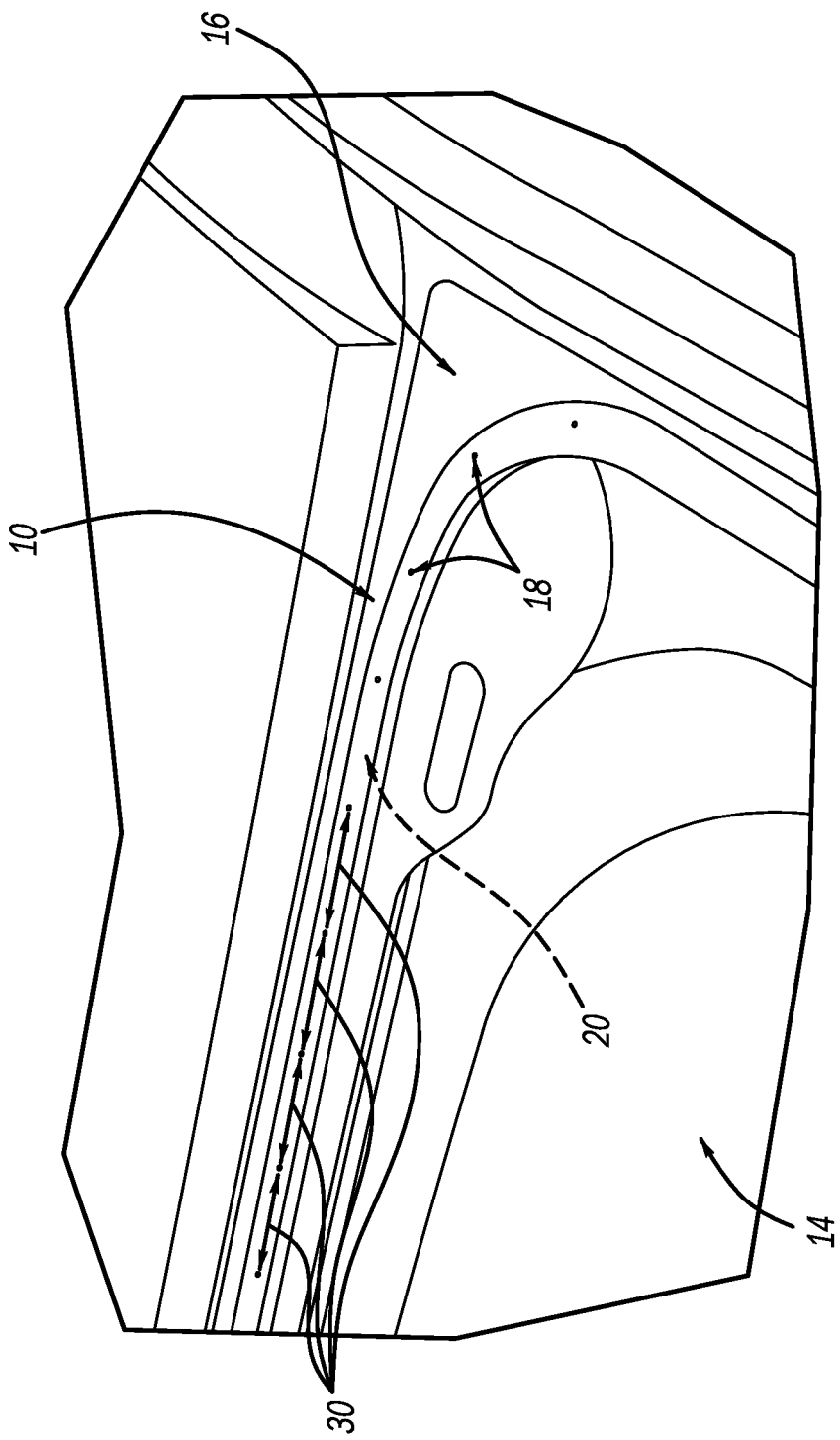
FIG. 3 is an enlarged perspective view of the windshield and the seal of FIG. 1 according to the present disclosure.
Figure 4:
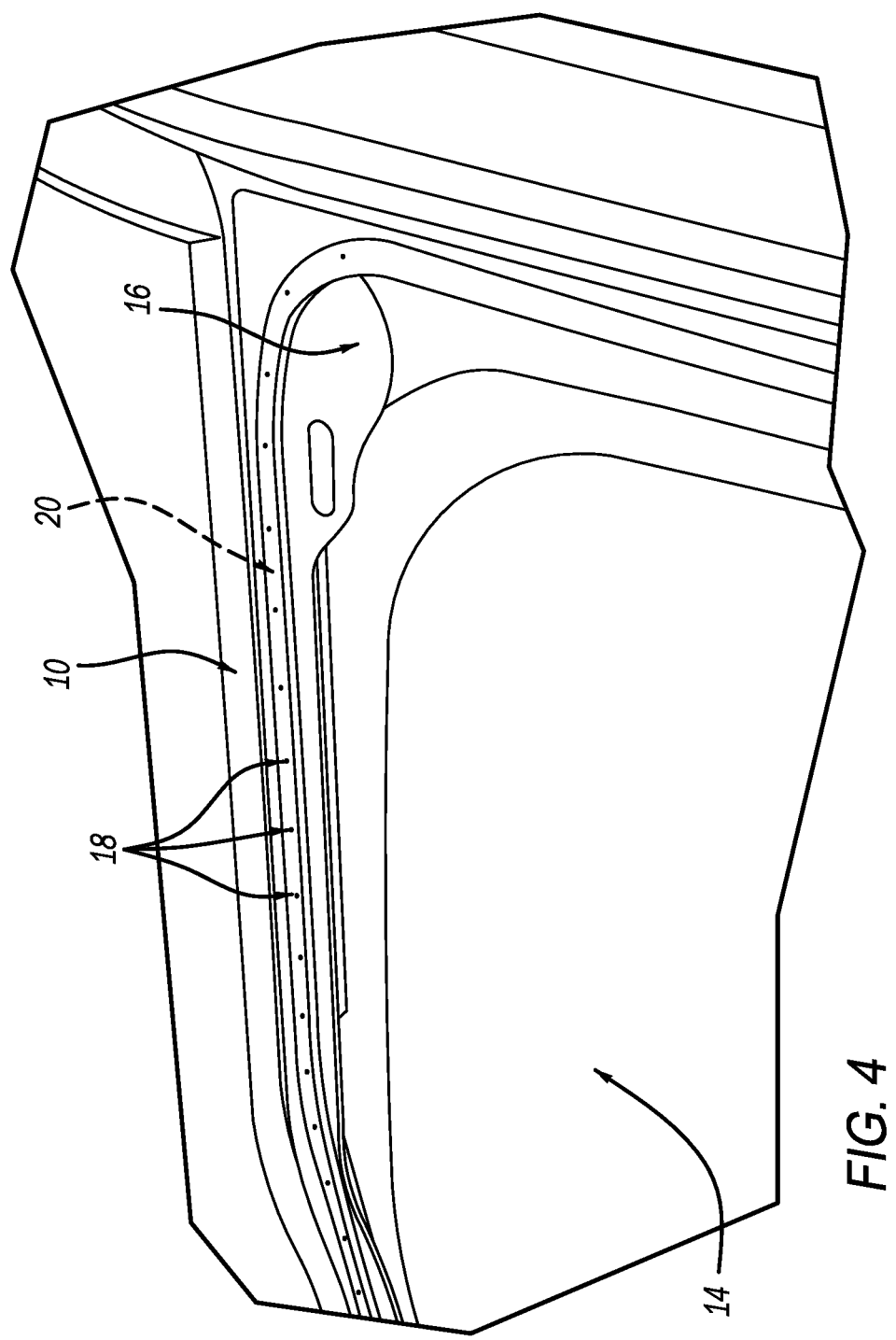
FIG. 4 is another enlarged perspective view of the windshield and the seal of FIG. 1 according to the present disclosure.
Figure 5:
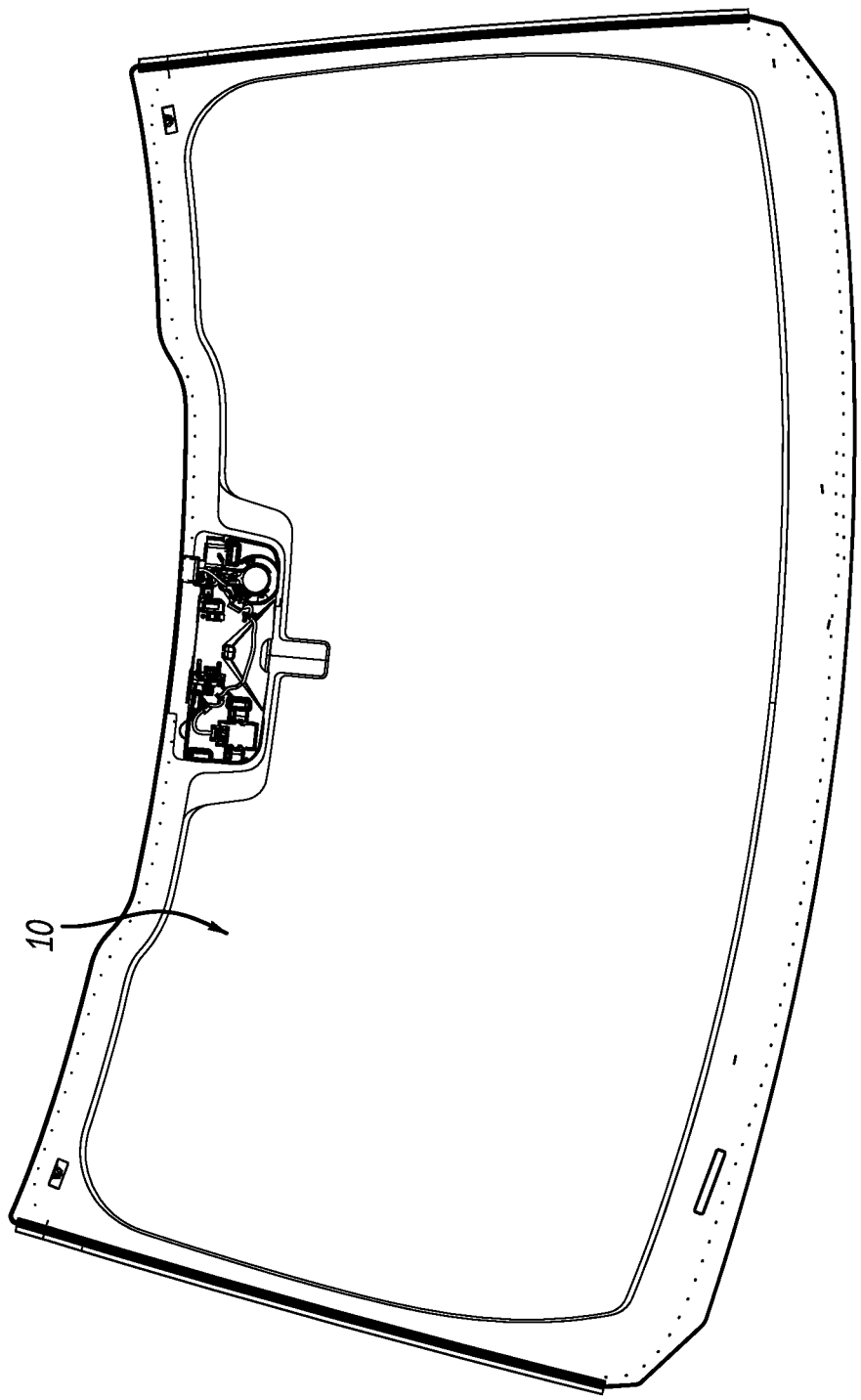
FIG. 5 is a perspective view of a windshield according to the present disclosure.
Figure 6:
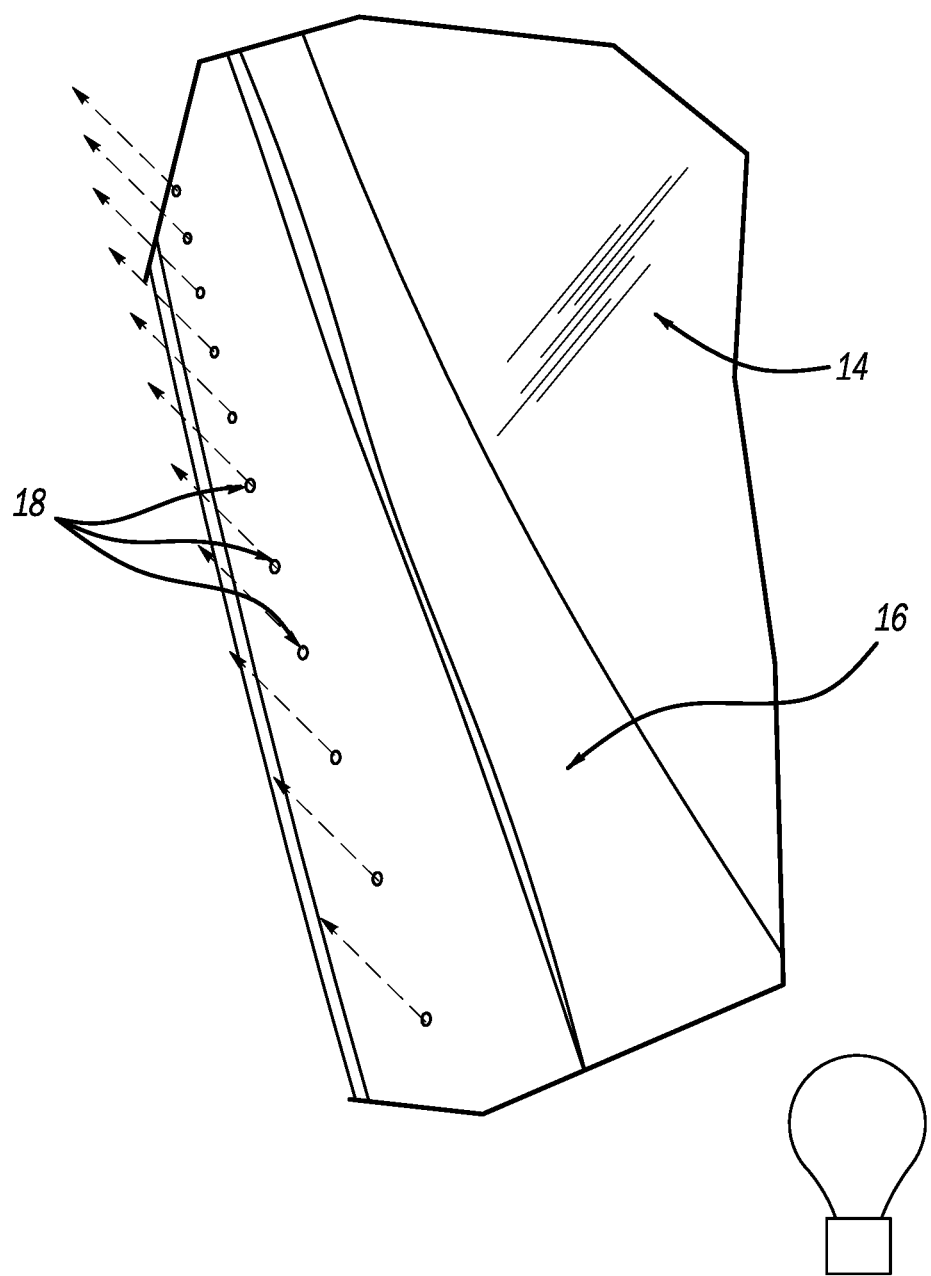
FIG. 6 is a perspective view of an overlay of the windshield with optical windows forming an illuminated path for a seal according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIGS. 1-4, a windshield 10 of a vehicle 12 includes a glass sheet 14 and an overlay 16 extending around a periphery of the glass sheet 14. The glass sheet 14 is made of a transparent material such that passengers in a passenger cabin of the vehicle 12 may see out of the glass sheet 14. The overlay 16 is made out of an opaque material and is the attachment point where the windshield 10 is secured to a vehicle body 22. In one form, the glass sheet 14 has a thickness that is greater than a thickness of the overlay 16. In some forms, the overlay 16 has a thickness that is greater than a thickness of the glass sheet 14. A seal 20 extends along a path delineated by a plurality of optical windows 18 formed in and extending through the overlay 16. The seal generally inhibits air, noise, and water/moisture from entering the passenger cabin. In the example illustrated, the seal 20 has an oval shape cross-section. In some forms, the seal 20 may have a circular shape cross-section, a rectangular shape cross-section, or any other suitable shape cross-section to provide sealing between the vehicle body 22 and the windshield 10. The overlay 16 has a periphery defining a contour that mates with the vehicle body 22.

Generally, the seal 20 secures and seals the boundary between the overlay 16 and the vehicle body 22. In this way, the seal 20 is not visible from the passenger cabin or from an exterior of the vehicle 12. The seal 20 is located in a groove 24 (FIG. 2) of the vehicle body 22 and extends along the contour of the overlay 16 and may deviate from the contour in one or more locations for ease of installation. In one form, the seal 20 is a polymeric material, such as urethane. As described below, a primer layer 26 is coated on the overlay 16, thereby causing the polymer of the seal 20 to adhere to the overlay 16. The seal 20 is press fit against the vehicle body 22 to seal the overlay 16 and the vehicle body 22.

The optical windows 18 are regions of the overlay 16 that have a greater light transmissibility than the remainder of the overlay 16. In one form, the optical windows 18 are apertures that pass through the overlay. In another form, the optical windows 18 are regions in the overlay that are solid but not opaque (e.g., the optical windows are translucent or transparent). In another form, the overlay 16 may be translucent but the optical windows 18 are more translucent or are transparent. The plurality of optical windows 18 in the overlay 16 indicate the path along which the seal 20 is to be applied to seal the overlay 16 to the vehicle body 22. The optical windows 18 are arranged substantially along the contour to provide the path along which the seal 20 is applied. The path formed by the optical windows 18 extends along an entire periphery of the overlay 16. In the form illustrated, the optical windows 18 are substantially circular or ovular, however, the optical windows 18 can have any suitable geometric shape, e.g., polygonal, square, rectangular, star-shaped, hemispherical, and a chevron shape, among others, while remaining within the scope of the present disclosure. In the form illustrated herein, a spacing 30 between the optical windows 18 is constant or uniform. In some forms, the spacing 30 between the optical windows 18 may be variable while remaining within the scope of the present disclosure. For example, the spacing 30 may be narrower in areas where the seal 20 extends along a curved path, such as in the corners of the overlay 16. Generally, the spacing 30 between the optical windows 18 is predetermined in order to apply the seal 20 at specified locations along the contour of the overlay 16 for enhanced sealing integrity.

Referring to FIGS. 5-8, a light source 32 (FIG. 8) provides light to the optical windows 18 of the overlay 16, illuminating the path along which the seal 20 is to be applied. In one form, the light source 32 is a handheld light emitter, such as a flashlight or a mobile device. In another form, the light source may be tube lights located underneath the windshield 10 at the station of the manufacturing environment where the seal 20 is being secured to the windshield 10. The overlay 16 is substantially opaque, and the light transmitted through the optical windows 18 contrasts with the overlay 16 to form the illuminated path. The optical windows 18 are sized to allow the light to pass through the overlay 16, and the seal 20 blocks the light through the optical windows 18, such that when the seal 20 is correctly installed, the illuminated path is not visible. The optical windows 18 are positioned along a center of the seal 20 when the seal 20 is correctly installed. However, when the seal 20 deviates from the illuminated path, light will be visible through the optical windows 18 (FIG. 8), indicating the seal 20 is not properly installed.

Figure 7:
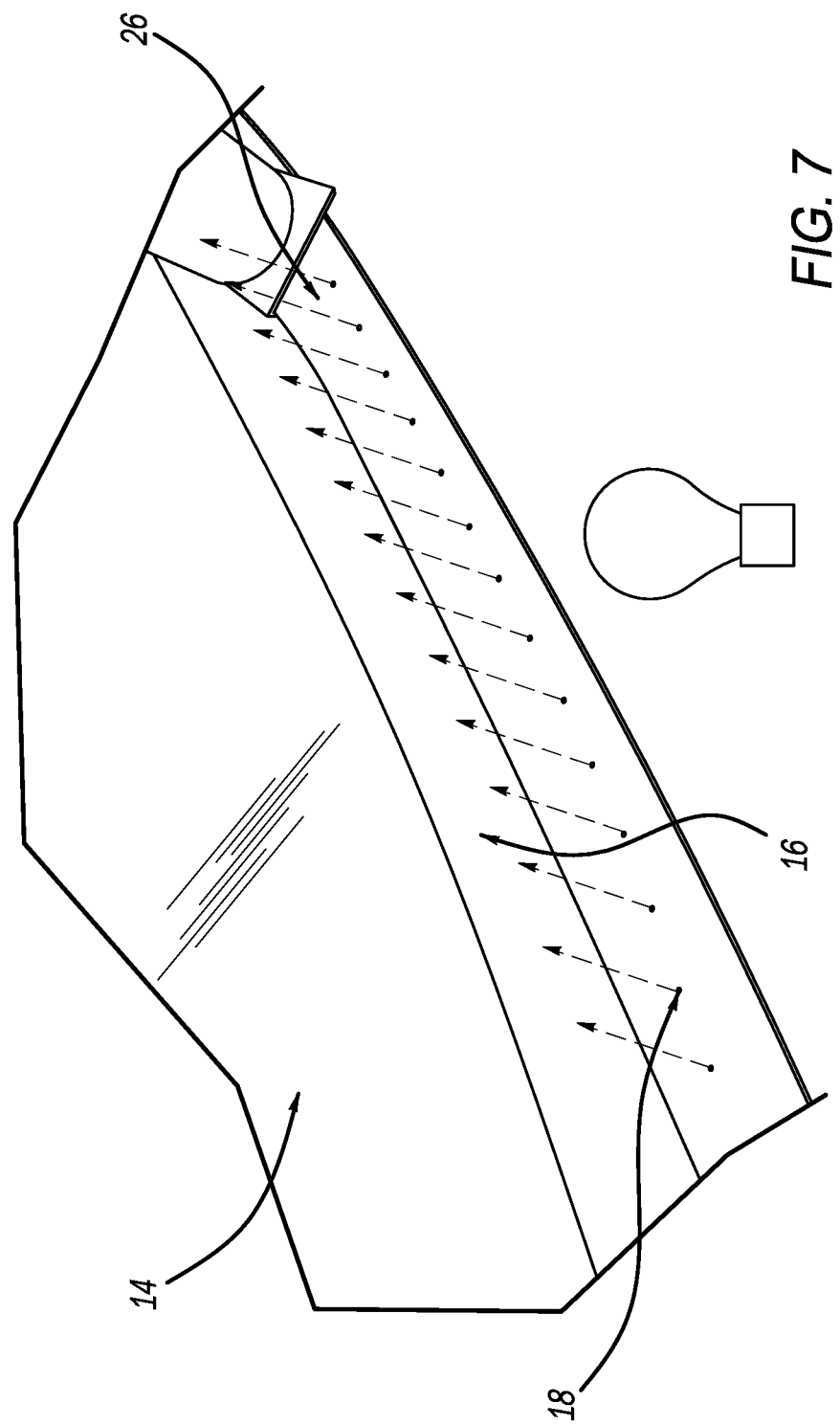
FIG. 7 is an enlarged perspective view of an application of a primer layer to the overlay along the illuminated path according to the present disclosure.
Figure 8:
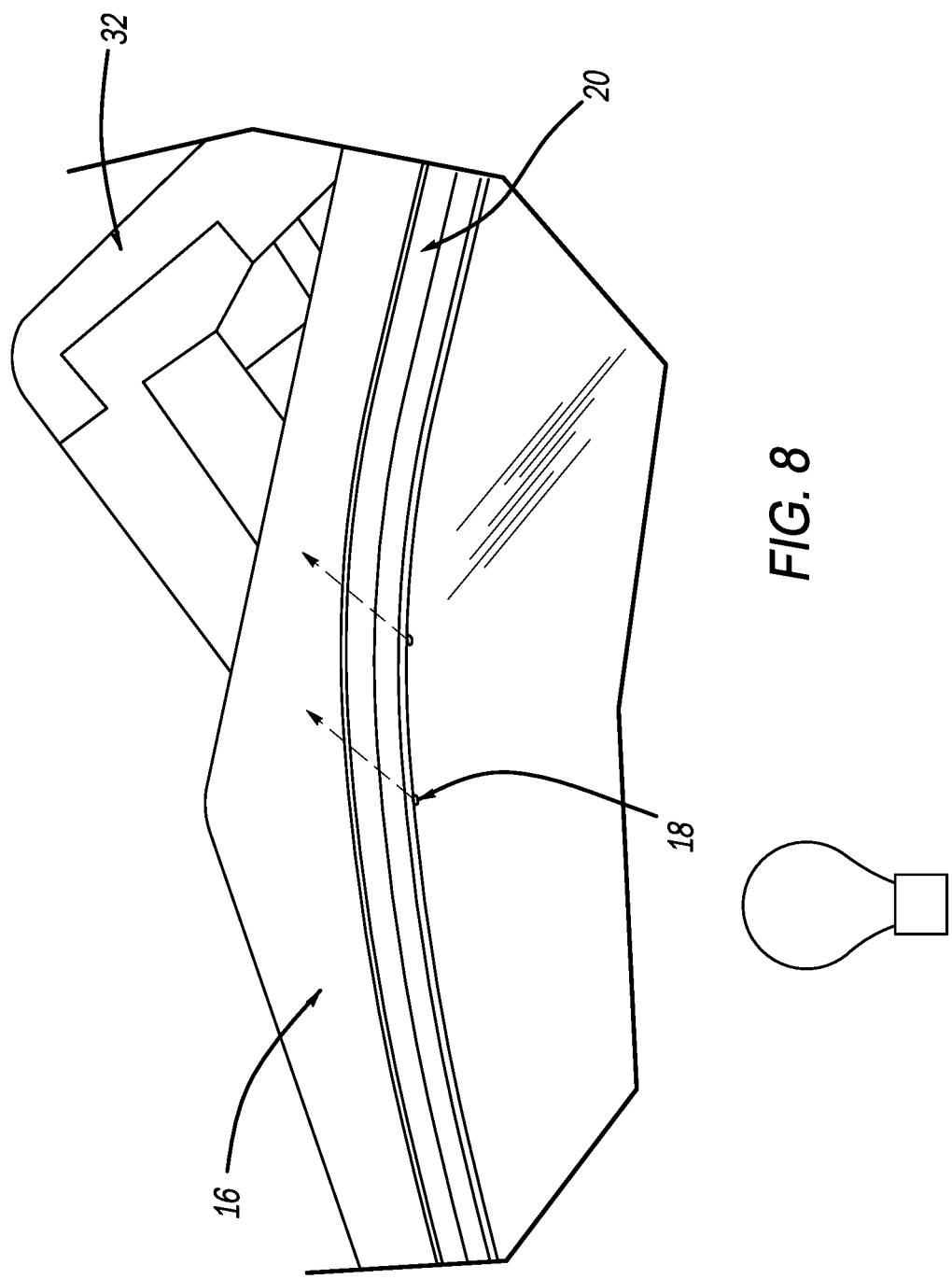
FIG. 8 is a perspective view demonstrating the seal deviating from the illuminated path according to the present disclosure.

With reference to FIG. 7, the primer layer 26 is applied to the overlay 16 along the illuminated path. In this way, the optical windows 18 facilitate application of the primer layer 26 to the overlay 16. The primer layer 26 is a conventional primer that helps to provide a more secure bond of the seal 20 to the overlay 16. The primer layer 26 is thus disposed between the seal 20 and the overlay 16 when the seal 20 is applied along the illuminated path. The seal 20 is adhered to the overlay 16 with the primer layer 26 along the illuminated path to position the seal 20 in a correct position to seal the windshield 10 and the vehicle body 22. Stated differently, the illuminated path provides that the seal 20 is correctly positioned along an entire contour of the overlay 16.

Figure 9A:
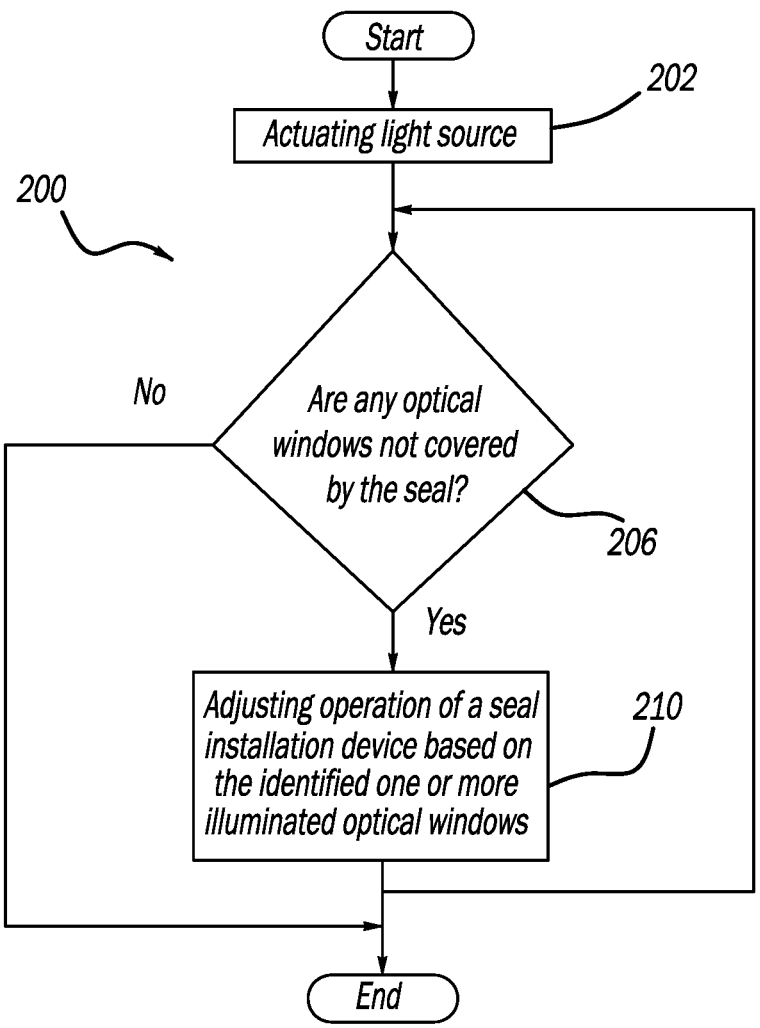
FIG. 9A is a flow chart illustrating a method for inspecting installation of a seal in accordance with the teachings of the present disclosure.
Figure 9B:
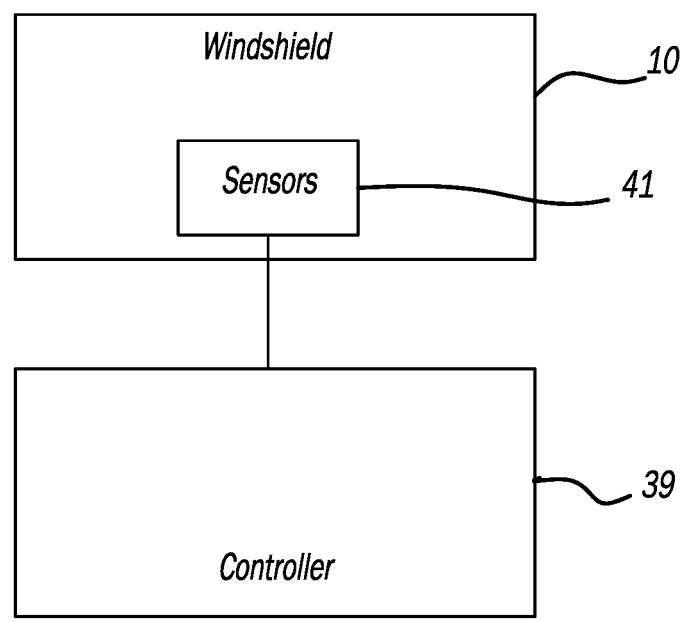
FIG. 9B is a block diagram schematically showing components of the windshield in accordance with the teachings of the present disclosure.

With reference to FIGS. 9A and 9B, a method 200 for inspecting installation of the seal 20 will be described in detail. First, at 202, a control algorithm, using a controller 39 (FIG. 9B), actuates the light source 32 to illuminate the optical windows 18 between the seal 20 and the overlay 16. Then, at 206, the control algorithm, using the controller 39, determines if any optical windows 18 are not covered by the seal 20. That is, in one form, the controller 39 may receive input from a sensor 41 (FIG. 9B) associated with the windshield 10 on whether or not any optical windows 18 are covered by the seal 20. If no optical windows 18 are identified, the control algorithm, using the controller 39, ends. If one or more optical windows 18 are identified, the control algorithm, using the controller 39, proceeds to 210. At 210, the control algorithm, using the controller 39, adjusts a seal installation device based on the identified one or more illuminated optical windows 18. The control algorithm, using the controller 39, loops back to 206 where it is determined if any optical windows 18 are not covered by the adjusted seal 20. As described above, the properly-installed seal 20 blocks the optical windows 18, and light that is still visible through the optical windows 18 indicates a deviation of the seal 20 from the illuminated path. With the light visible through the optical windows 18, the seal deviates from the illuminated path, and thus the seal 20 is not properly installed to the overlay 16. When no light is visible through the optical windows 18, the seal 20 is determined to be properly installed along the illuminated path.

The seal installation device (not shown) applies the seal along the illuminated path. The seal installation device may be manual or automated, and with an automated seal installation device, the controller 39 is configured to instruct the operator or robot to place of the seal 20 onto the overlay 16 to cover the optical windows 18. The controller 39 can instruct the operator using a visual and/or audio signal. When deviations from the illuminated path are detected, a programmed path along which the seal installation device applies the seal 20 is adjusted to cover the identified illuminated windows 18 that were not covered by the previously inspected seal. Upon adjusting the seal installation device, the seal installation device is actuated to apply a second seal to a second overlay of a second windshield to cover optical windows disposed thereon. Then, the second seal is inspected for any deviations from the illuminated path.

Figure 10:
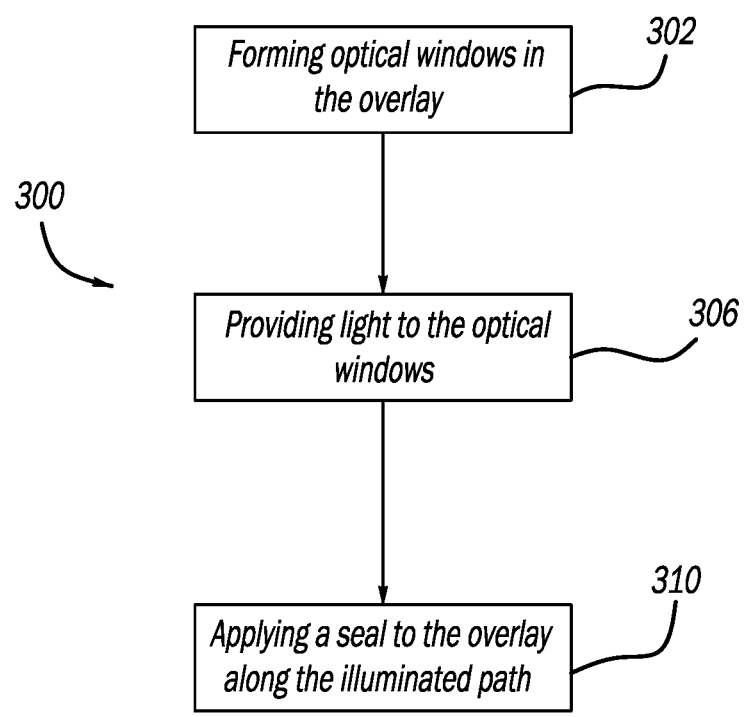
FIG. 10 is a flow chart illustrating a method for forming a windshield in accordance with the teachings of the present disclosure.

With reference to FIG. 10, a method 300 for forming a windshield 10 will be described in detail. First, at 302, optical windows 18 are formed in the overlay 16 around a periphery of the glass sheet 14. Then, at 306, light is provided to the optical windows 18 to illuminate a path between the optical windows 18. Then, at 310, the seal is applied to the overlay 16 along the illuminated path to cover the optical windows 18. Without the optical windows 18, it may be difficult to control the seal 20 placement along the contour of the overlay 16, which can lead to increased assembly time. The method 300 described above including securing the seal 20 along the illuminated path allows for enhanced control of the seal 20 placement along the contour of the overlay 16, which reduces assembly time and provides that the seal 20 is correctly placed on the overlay 16.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle windshield comprising:
a glass sheet;
an overlay extending around a periphery of the glass sheet, the overlay including a plurality of optical windows defined therein; and
a seal extending along a path delineated by the plurality of optical windows and covering the plurality of optical windows.

2. The vehicle windshield of claim 1, further comprising a primer layer disposed between the seal and the overlay.

3. The vehicle windshield of claim 1, wherein the seal is a urethane material.

4. The vehicle windshield of claim 1, wherein the optical windows are made of a transparent material and the overlay is made of an opaque material.

5. The vehicle windshield of claim 1, wherein the overlay defines a contour, and wherein the plurality of optical windows are arranged substantially along the contour.

6. The vehicle windshield of claim 1, wherein each optical window of the plurality of optical windows defines a geometrical shape selected from the group consisting of: circular, elliptical, a polygonal, square, and rectangular shape.

7. The vehicle windshield of claim 1, wherein a spacing, taken along the path, between the plurality of optical windows is constant.

8. The vehicle windshield of claim 1, wherein the seal is disposed between the overlay and a vehicle body.

9. The vehicle windshield of claim 1, wherein the overlay is made of an opaque material.

10. A vehicle windshield comprising:
a glass sheet;
an overlay extending around a periphery of the glass sheet, the overlay including a plurality of optical windows defined therein; and
a seal extending along a path delineated by the plurality of optical windows and covering the plurality of optical windows, wherein the optical windows are apertures extending through the overlay.

11. The vehicle windshield of claim 10, further comprising a primer layer disposed between the seal and the overlay.

12. The vehicle windshield of claim 10, wherein the seal is a urethane material.

13. The vehicle windshield of claim 10, wherein the optical windows extend along an entire periphery of the overlay.

14. The vehicle windshield of claim 10, wherein the overlay defines a contour, and wherein the plurality of optical windows are arranged substantially along the contour.

15. The vehicle windshield of claim 10, wherein each optical window of the plurality of optical windows defines a geometrical shape selected from the group consisting of: circular, elliptical, a polygonal, square, and rectangular shape.

16. The vehicle windshield of claim 10, wherein a spacing, taken along the path, between the plurality of optical windows is constant.

17. The vehicle windshield of claim 10, wherein the seal is disposed between the overlay and a vehicle body.

18. The vehicle windshield of claim 10, wherein the overlay is made of an opaque material.

19. A vehicle windshield comprising:
a glass sheet;
an overlay extending around a periphery of the glass sheet, the overlay including a plurality of optical windows defined therein; and
a seal disposed between the overlay and a vehicle body and extending along a path delineated by the plurality of optical windows, the seal covering the plurality of optical windows,
wherein the optical windows are apertures extending through the overlay, and
wherein a spacing, taken along the path, between the plurality of optical windows is constant.

20. The vehicle windshield of claim 19, wherein the optical windows extend along an entire periphery of the overlay.

* * * * *